(12) United States Patent
Frederick et al.

(10) Patent No.: US 10,668,793 B2
(45) Date of Patent: Jun. 2, 2020

(54) RETRACTABLE AUTONOMOUS ROOF PANEL

(71) Applicant: TOYOTA MOTOR ENGINEERING & MANUFACTURING NORTH AMERICA, INC., Erlanger, KY (US)

(72) Inventors: Scott L Frederick, Brighton, MI (US); Scott P Robison, Dexter, MI (US); Adam D Holmstrom, Pinckney, MI (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 0 days.

(21) Appl. No.: 15/862,940

(22) Filed: Jan. 5, 2018

(65) Prior Publication Data

US 2019/0210436 A1     Jul. 11, 2019

(51) Int. Cl.
| | |
|---|---|
| *B60J 7/043* | (2006.01) |
| *G05D 1/02* | (2020.01) |
| *B62D 25/06* | (2006.01) |
| *B60R 11/04* | (2006.01) |
| *B60R 13/02* | (2006.01) |
| *B60R 11/00* | (2006.01) |

(52) U.S. Cl.
CPC ............... *B60J 7/043* (2013.01); *B60R 11/04* (2013.01); *B60R 13/0231* (2013.01); *B62D 25/06* (2013.01); *G05D 1/0231* (2013.01); *B60R 2011/004* (2013.01)

(58) Field of Classification Search
CPC ...... B60J 7/043; B60R 11/04; B60R 13/0231; B60R 2011/004; B62D 35/00; B62D 25/06; G05D 1/0231

USPC .................................. 296/107, 210, 222
See application file for complete search history.

(56) References Cited

U.S. PATENT DOCUMENTS

| | | | |
|---|---|---|---|
| 3,689,695 A | 9/1972 | Rosenfield et al. | |
| 5,078,441 A * | 1/1992 | Borskey | B60J 7/165 |
| | | | 292/DIG. 72 |
| 6,067,012 A | 5/2000 | Harding | |
| 7,651,250 B2 | 1/2010 | Griffin | |

(Continued)

FOREIGN PATENT DOCUMENTS

EP          0 253 045 A1      1/1988

*Primary Examiner* — Joseph D. Pape
*Assistant Examiner* — Dana D Ivey
(74) *Attorney, Agent, or Firm* — Oblon, McClelland, Maier & Neustadt, L.L.P.

(57) ABSTRACT

A retractable roof apparatus for an autonomous hardtop vehicle is described. The apparatus includes a vehicle roof having an opening to a compartment that extends below the surface of the vehicle roof and a retractable cover assembly that encloses sensor devices. The retractable cover assembly includes a top panel having a peripheral size and shape that matches the roof opening to the compartment. The sensors include an array of cameras having a field of view of the full width of the vehicle in at least the front of the vehicle when the retractable roof cover is in the raised position. The height of the top panel in the raised position above the vehicle roof is a minimal height to accommodate the height of the cameras. When the retractable cover assembly is retracted into the compartment, the top panel is flush with the surrounding roof panel of the vehicle.

14 Claims, 4 Drawing Sheets

(56) References Cited

U.S. PATENT DOCUMENTS

| | | | | |
|---|---|---|---|---|
| 7,726,690 B1* | 6/2010 | James | ............ | B60J 7/165 |
| | | | | 280/764.1 |
| 9,731,771 B2 | 8/2017 | Sakabe et al. | | |
| 10,011,230 B1* | 7/2018 | Brown | ............ | H04N 7/181 |
| 2002/0048173 A1 | 4/2002 | Schmucker | | |
| 2016/0236725 A1 | 8/2016 | Shirai | | |
| 2017/0369106 A1* | 12/2017 | Williams | ............ | B62D 35/00 |
| 2018/0015886 A1* | 1/2018 | Frank | ............ | B60R 11/04 |

* cited by examiner

RETRACTABLE AUTONOMOUS ROOF PANEL

BACKGROUND

Autonomous vehicles, also known as a driverless car, self-driving car, robotic car, and unmanned ground vehicle are controlled with the aid of sensors. The sensors to sense the environment so that the vehicle can navigate without human input. Sensory techniques can include radar, laser light, GPS, odometry, and computer vision. Sensors used in these techniques may be arranged in an array mounted on the roof of the vehicle.

FIG. 4 shows an example sedan type car with an array of sensor devices mounted on racks attached to the roof area. The sensor devices include cameras to cover a 360 degree view around the vehicle. Some sensor devices may need to be positioned at different elevations above other devices to avoid being obscured. An example device that may need to be positioned above other devices is known as a LIDAR. A LIDAR is radar device that uses laser light. It can be used to make a 3D representation of the area surrounding a vehicle. Thus, sensor arrays mounted on vehicles may require an arrangement in which several types of sensors are provided with unobstructed views.

At the same time, there are cases where it may not be desirable to operate in a completely autonomous fashion. A hybrid approach to an autonomous vehicle may be more practical. For example, autonomous operation without human input may be possible in environments that have been specially designed for autonomous vehicles. Such environments may include special lanes in roads and highways in which markings have been made in the sides of the roads to indicate boundaries and guide navigation. The markings may be indications that are known beforehand to the vehicle. Other environments may not be suitable for completely autonomous operation. Environments that may not be suitable for autonomous operation may include rural or other settings where roads may not be sufficiently marked. Also, a driver may simply decide to drive the vehicle with his/hers own input.

The conventional rack arrangement exposes the various sensor devices to environmental conditions, causes aerodynamic drag, and is unappealing.

The foregoing "Background" description is for the purpose of generally presenting the context of the disclosure. Work of the inventor, to the extent it is described in this background section, as well as aspects of the description which may not otherwise qualify as prior art at the time of filing, are neither expressly or impliedly admitted as prior art against the present invention.

SUMMARY

The present disclosure also relates to a system

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
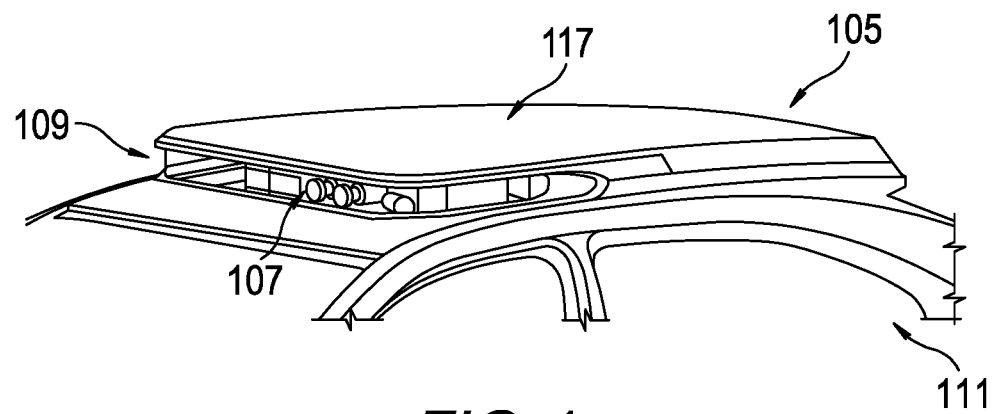
FIG. 1 is a perspective view of a structure of a retractable roof panel according to one example.

Referring now to the drawings, wherein like reference numerals designate identical or corresponding parts throughout several views, the following description relates to a retractable roof panel for an autonomous vehicle. Autonomous vehicles require several sensor devices which together cause an aerodynamic drag on the vehicle and are visually unappealing. Disclosed are embodiments that provide a solution to these problems.

FIG. 1 is a perspective view of a structure of a retractable roof cover assembly for an autonomous vehicle according to an exemplary aspect of the disclosure. In a raised position, a roof cover assembly 105 covers the various sensor devices 107, and a transparent window 109 allows for an unobstructed view for the sensor devices. The top panel 117 of the roof cover assembly takes the shape of an opening area in the roof of the vehicle 111. The height of the roof cover assembly in the raised position is a minimal height sufficient for the highest sensor, which may be a LIDAR situated above the level of cameras.

The top panel of the roof cover assembly 105 may be made of the same material as the rest of the vehicle roof which may include a composite material of metal and plastic, or sheet metal. In an exemplary aspect, the top panel may be made of a different material, such as a resin. The transparent window 109 may be made of the same material as the vehicle windshield. In an exemplary aspect, the transparent window 109 may be made of a transparent resin, glass, clear plastic, or a combination thereof.

Figure 2:
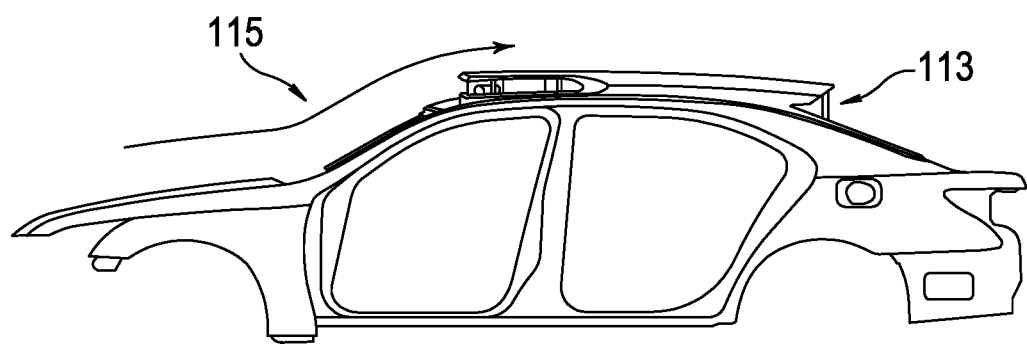
FIG. 2 is a side view of the retractable roof panel shown in a raised position according to one example.

As can be seen in FIG. 2, in a raised position, the roof cover assembly 105 provides for an aerodynamic flow 115 of air over the vehicle. However, aerodynamic flow is improved when the roof cover is in the retracted position. The view shown in FIG. 2 shows the arrangement transparent window 113 in the rear of the roof cover assembly 105. In an exemplary aspect the roof cover assembly 105 extends toward the rear of the roof of the vehicle to an extent that is sufficient for a rear camera to have a full range of view that the camera can accommodate. In an exemplary aspect, all sides along the periphery of the roof cover assembly 105 may be transparent.

Figure 3:
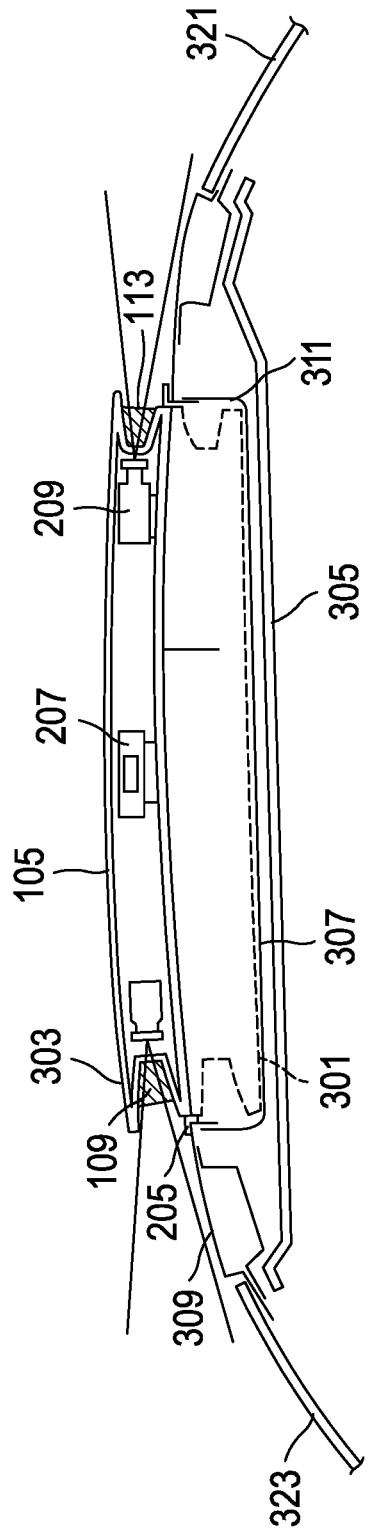
FIG. 3 is a side view of the retractable roof panel showing the retracted position according to one example.
Figure 4:
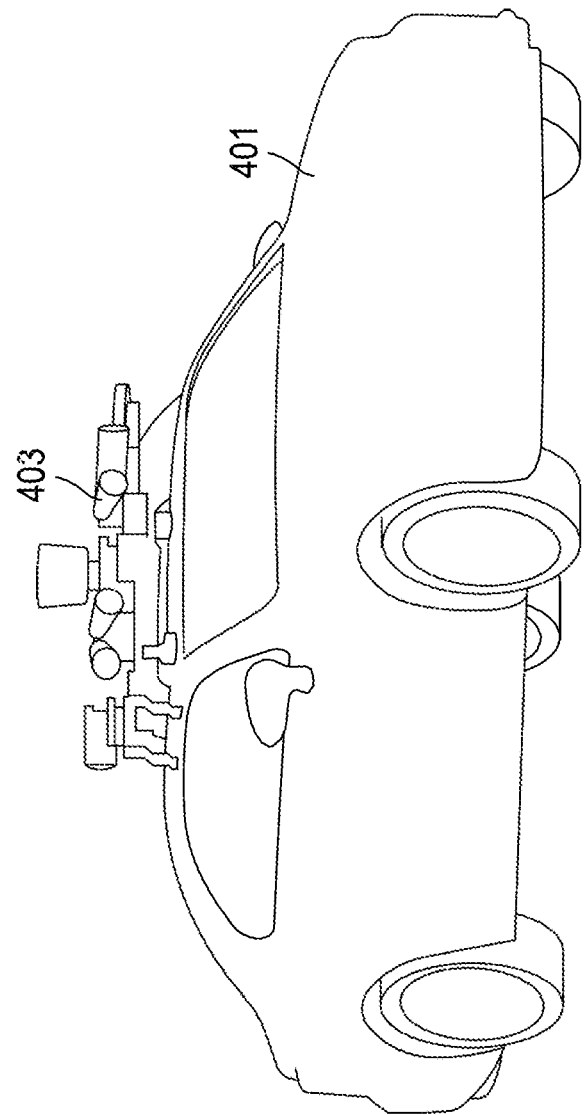
FIG. 4 shows a conventional structure for mounting sensors on a sedan-type vehicle.

FIG. 3 is a side view of the roof cover assembly 105 showing the retracted position 301 according to one example. The roof cover assembly 105 may be retracted into a sealed compartment 307 that is deep enough for the top panel of the roof cover assembly 105 to become flush with the surrounding roof panel 309 of the vehicle. The sealed compartment includes a weatherstrip seal 205 around the peripheral of the opening 311 in the roof panel 309. The weatherstrip 205 seals the compartment from moisture when the roof cover assembly is at a raised position and when the roof cover assembly is in a retracted position. The weatherstrip 205 may be made using a known material, such as the material used in other weatherstripping in a vehicle. The lower side of the sealed compartment includes a headliner 305. The headliner 305 provides a comparable head space in the passenger compartment to a vehicle model not having the retractable roof cover so as not to impair the convenience of the passenger.

The autonomous vehicle is provided with an angled roof edge panel 309 extending from the windshield 323 to provide aerodynamic air flow with the roof cover in retracted position while providing a sufficient field of view for cameras in the raised position 303. FIG. 3 shows an example of the arrangement of the LIDAR 207 and rear cameras 209 relative to a rear windshield 321 of the vehicle. In an exemplary aspect, the LIDAR 207 may be arranged at a height such that the beam that is projected is unobstructed by other sensors mounted in the roof cover. In an exemplary aspect, the LIDAR 207 may be mounted on the roof panel, on top of the roof cover, with other sensors mounted within the roof cover.

In one embodiment, the roof cover assembly is removable as a unit so that the entire roof cover enclosing the array of sensors can be replaced with a roof cover having a different arrangement of sensors. In an exemplary aspect, a portion of the roof cover assembly may be removed to provide access to sensors for purposes of repair, adjustment and/or replacement. In an exemplary aspect, each of the sensors in the roof cover is adjustable, at least so that they may be rotated. In some aspects, the sensors may be mounted such that they may be raised or lowered within the roof cover assembly. The base of the roof cover assembly to which sensors are mounted may be made of a resin or plastic, or metal, depending on the mounting structure.

Figure 5:
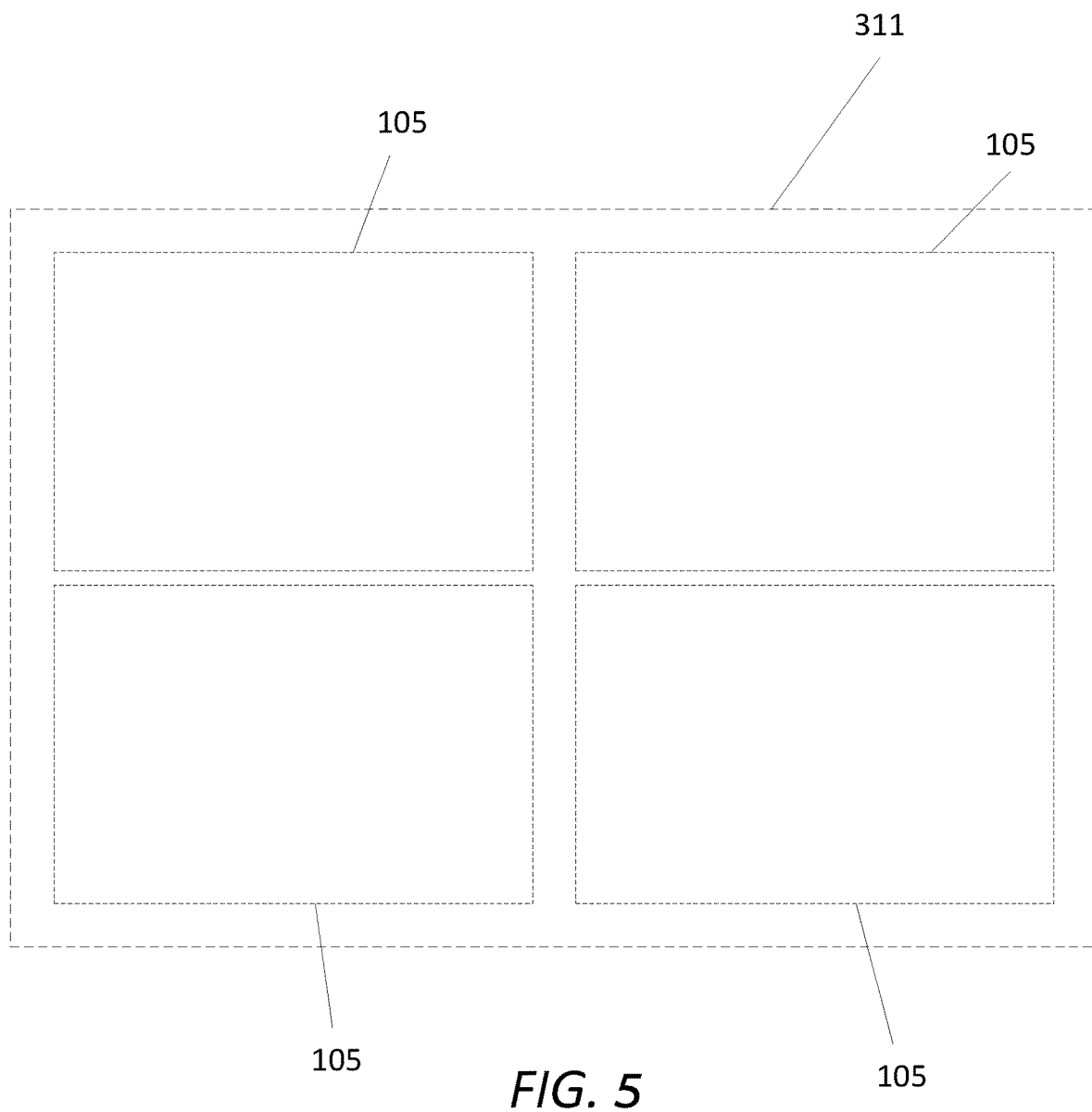
FIG. 5 shows a schematic of an alternative embodiment of the invention that includes a plurality of cover assembly units.

In some embodiments, the retractable cover assembly may be sizes other than that shown in the drawings. For example, the retractable cover assembly may be the size and shape of a sunroof or a moon roof opening. The retractable cover assembly may also be reduced in size to cover groups of sensor units, rather than spread out to cover all sensors. In some embodiments, the retractable cover assembly may be several assembly units (as shown in FIG. 5). For example, one cover assembly unit may enclose sensors located in the front of the roof and another cover assembly may enclose sensors located in the rear of the roof. In some embodiments, the retractable cover assembly may be larger than the area of the vehicle roof when in the raised position. In such case, the retractable cover assembly may fold or retract within itself before being lowered into the compartment.

In some embodiments, the retractable roof cover assembly is raised and lowered manually. In some embodiments, the retractable roof cover assembly is raised and lowered by motor-driven cables. In an exemplary aspect, the sensor devices, including cameras and LIDAR are wired to a controller installed in a trunk of the vehicle. In an exemplary aspect, the retractable roof cover assembly is automatically moved to a raised position when the vehicle is placed into an autonomous driving mode. In an exemplary aspect, the retractable roof cover assembly is automatically lowered to the retracted position when the vehicle is placed into a manual driving mode. In an exemplary aspect, the retractable roof cover assembly is raised and lowered based on user operation of a switch or equivalent mechanism.

The retractable roof cover assembly provides good aerodynamics in both the raised and retracted position. The height of the roof cover above the roof in the raised position is minimized due to distributed arrangement of sensors. Cameras may be arranged close to a periphery of the roof cover assembly where they can obtain a full range of view that is equivalent to their field of view.

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A retractable roof apparatus for an autonomous hardtop vehicle, the apparatus comprising:
   a vehicle roof having an opening to a compartment within the vehicle roof that extends below the surface of the vehicle roof; and
   a retractable cover assembly that encloses a plurality of sensor devices and is retractable into the compartment of the vehicle roof;
   the retractable cover assembly includes a top panel having a peripheral size and shape that matches the opening of the vehicle roof,
   wherein the plurality of sensors include an array of cameras having a field of view of the full width of the vehicle in at least the front of the vehicle when the retractable cover assembly is in a raised position, the height of the roof panel in the raised position above the vehicle roof is a minimal height to accommodate the height of the cameras,
   wherein when the retractable cover assembly is retracted into the compartment, the top panel is flush with the surrounding roof panel of the vehicle.

2. The apparatus of claim 1, wherein the opening to the compartment is a sunroof opening that is configured to mount the compartment.

3. The apparatus of claim 1, wherein the opening to the compartment is a moon roof opening that is configured to mount the compartment.

4. The apparatus of claim 1, wherein the retractable cover assembly includes a plurality of retractable cover assemblies, each enclosing a subset of the plurality of sensors.

5. The apparatus of claim 1, wherein a front side of the retractable cover assembly arranged to face the front of the vehicle is of a transparent material that allows a full range of view that is sufficient for the camera's field of view when positioned to face the front of the vehicle,
   wherein a rear side of the roof cover arranged to face the rear of the vehicle is of a transparent material that allows a full range of view that is sufficient for the cameras field of view when positioned to face the rear of the vehicle.

6. The apparatus of claim 1, wherein cameras are positioned at the front edge and rear edge of the retractable cover assembly.

7. The apparatus of claim 1, wherein the compartment is sealed to prevent moisture from entering the compartment while the retractable cover assembly is in a raised position and while the retractable cover assembly is in a lowered position.

8. The apparatus of claim 7, wherein the compartment is sealed with a weatherstrip around the roof panel surrounding the opening.

9. The apparatus of claim 1, wherein the lower side of the compartment is a headliner.

10. The apparatus of claim 1, wherein the plurality of sensors include a LIDAR,
   wherein the height of the top panel in the raised position above the vehicle roof panel is a minimal height to accommodate the height of the LIDAR.

11. The apparatus of claim 5, wherein the top panel is made of the same material as the material of the vehicle roof panel, and the transparent material is the same material as a windshield of the vehicle.

12. The apparatus of claim 5, wherein the transparent material includes one or more of glass, plastic, and a transparent resin.

13. The apparatus of claim 1, wherein the retractable cover assembly is automatically movable to a raised position when the vehicle is put into an autonomous driving mode.

14. The apparatus of claim 1, wherein the peripheral edges of the retractable cover assembly is made of a transparent resin which allows a signal transmitted from the sensors to pass through substantially unobstructed.

\* \* \* \* \*